United States Patent
Kawanago et al.

(10) Patent No.: US 11,376,694 B2
(45) Date of Patent: Jul. 5, 2022

(54) FLUX AND SOLDER PASTE

(71) Applicant: Senju Metal Industry Co., Ltd., Tokyo (JP)

(72) Inventors: Tomohisa Kawanago, Tochigi (JP); Miyuki Hiraoka, Tochigi (JP); Takahiro Nishizaki, Campbell, CA (US); Hiroyoshi Kawasaki, Tokyo (JP); Masato Shiratori, Tochigi (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 16/961,975

(22) PCT Filed: Jan. 15, 2019

(86) PCT No.: PCT/JP2019/000891
§ 371 (c)(1),
(2) Date: Jul. 14, 2020

(87) PCT Pub. No.: WO2019/142772
PCT Pub. Date: Jul. 25, 2019

(65) Prior Publication Data
US 2020/0361039 A1    Nov. 19, 2020

(30) Foreign Application Priority Data

Jan. 17, 2018  (JP) .............................. JP2018-005919

(51) Int. Cl.
*B23K 35/36* (2006.01)
*B23K 35/362* (2006.01)
*B23K 35/02* (2006.01)

(52) U.S. Cl.
CPC .......... *B23K 35/362* (2013.01); *B23K 35/025* (2013.01)

(58) Field of Classification Search
CPC .............................. B23K 35/362; B23K 35/025
USPC ........................................................... 148/23
See application file for complete search history.

(56) References Cited

U.S. PATENT DOCUMENTS

| | | | |
|---|---|---|---|
| 4,495,007 A | 1/1985 | Zado | |
| 7,767,032 B2 | 8/2010 | Sheng et al. | |
| 9,533,380 B2 | 1/2017 | Endoh et al. | |
| 10,357,852 B2* | 7/2019 | Kajikawa | B23K 35/362 |
| 2018/0257182 A1* | 9/2018 | Kajikawa | B23K 35/3612 |

FOREIGN PATENT DOCUMENTS

| | | |
|---|---|---|
| CN | 101484271 A | 7/2009 |
| CN | 104066534 A | 9/2014 |
| CN | 107262968 A | 10/2017 |
| JP | S61501377 A | 7/1986 |
| JP | 2014100737 A | 6/2014 |
| JP | 2015142936 A | 8/2015 |
| JP | 201756485 A | 3/2017 |
| JP | 2017056485 A | 3/2017 |
| WO | 2015146473 A1 | 10/2015 |
| WO | 2017047694 A1 | 3/2017 |

* cited by examiner

*Primary Examiner* — Weiping Zhu
(74) *Attorney, Agent, or Firm* — The Webb Law Firm

(57) ABSTRACT

Provided is flux that can achieve a low residue so as to make it possible to ensure solder wettability, ensure holding properties of a solder ball, and suppress the amount of residue after soldering and enable application for use without washing.

The flux includes 1-15% by weight of an organic acid mixture comprising an organic acid with 10 or more carbon atoms, 50-90% by weight of isobornyl cyclohexanol, and 5-45% by weight of a different solvent. The proportion of the isobornyl cyclohexanol is 50-95% by weight, where 100% by weight is the total of the isobornyl cyclohexanol and the different solvent. The organic acid mixture comprising the organic acid with 10 or more carbon atoms comprises 2-methylnonanedioic acid, 4-(methoxycarbonyl)-2,4-dimethylundecanedioic acid, 4,6-bis(methoxycarbonyl)-2,4,6-trimethyldecanedioic acid, and 8,9-bis(methoxycarbonyl)-8,9-dimethylhexadecanedioic acid.

8 Claims, No Drawings

FLUX AND SOLDER PASTE

CROSS-REFERENCE TO RELATED APPLICATIONS

This application is the United States national phase of International Application No. PCT/JP2019/000891 filed Jan. 15, 2019, and claims priority to Japanese Patent Application No. 2018-005919 filed Jan. 17, 2018, the disclosures of which are hereby incorporated by reference in their entirety.

TECHNICAL FIELD

The present invention relates to a flux for use in soldering and a solder paste using the flux.

BACKGROUND

In general, a flux used in soldering has effects of chemically removing metal oxides present on solder and the metal surface of a joint target to be soldered and allowing movement of metal elements at the boundary between the two. Therefore, by soldering using the flux, an intermetallic compound can be formed between the solder and the metal surface of the joint target, so that strong joint can be obtained.

In recent years, with the development of small information devices, rapid miniaturization of electronic components to be mounted has progressed. In order to meet the demand for the reduction of connection terminals and the reduction of the mounting area due to the demand for miniaturization, the electronic components employs a ball grid array (BGA) in which electrodes are arranged on their back surface.

Solder bumps are formed on the BGA electrodes. As a method for making a solder bump, a method of mounting a solder ball on an electrode coated with a flux followed by heating has been adopted. In recent years, with the miniaturization of electronic components, the narrowing of an electrode pitch, which is a soldering site of the electronic components, is progressing. Due to the narrowing of the electrode pitch, the diameter of the solder balls mounted on the electrodes is also becoming smaller.

In soldering using solder balls, there is a problem that, if the solder balls cannot be retained with flux at ordinary temperature before heating, the positions of the solder balls are displaced with respect to the electrodes, thereby giving rise to a state where the solder balls are detached from the electrode pad (ball missing). Such a problem becomes remarkable due to the narrowing of the electrode pitch.

The flux used for soldering contains an activator that removes metal oxides, rosin, a solvent, and the like. Rosin has heat resistance to heating up to a temperature range assumed for soldering, and has a function of protecting the activator. In addition, the addition of rosin increases the viscosity of the flux at ordinary temperature, and imparts solder ball retention to the flux. Furthermore, a flux having a viscosity increased by adding a high-viscosity solvent in addition to rosin has also been proposed (see, for example, Patent Document 1). A solder paste containing a flux having a viscosity increased by adding a high-viscosity solvent in addition to rosin has also been proposed (see, for example, Patent Document 2).

Also, in soldering using solder balls, there is a problem that, if solder wettability cannot be ensured, the solder does not spread evenly over the electrodes, and that the positions of the solder balls are displaced with respect to the electrodes, thereby giving rise to ball missing.

Patent Document 1: Japanese Patent Application Publication No. 2014-100737
Patent Document 2: Japanese Patent Application Publication No. 2015-142936

SUMMARY

When soldering is performed, it is required that molten solder should be sufficiently wet-spread, and thus the flux is required to have activity capable of removing a metal oxide film.

However, in the case of using a general organic acid to be added to the flux as the activator, if the amount to be added is small, the organic acid volatilizes by heating up to the temperature range assumed for soldering, resulting in insufficient activity and failure to ensure wettability. Moreover, when the amount to be added is increased to ensure wettability, the residue amount increases.

When the residue amount increases, the flux may become unsuitable for non-washing applications in which residues after soldering are not washed for use. Thus, a flux with low residue is required.

In addition, due to inclusion of rosin in the flux, it becomes possible to increase the viscosity of the flux at ordinary temperature and to retain the solder balls, and also to protect the organic acid with rosin against heating up to a temperature range assumed for soldering.

However, rosin does not volatilize by heating to a temperature range assumed for soldering, and the flux may become unsuitable for non-washing applications. Thus, a low residue flux is required.

Accordingly, in applications in which the residues after soldering are not washed for use, it is preferable that sufficient activity be obtained even with a small amount of a component that functions as an activator. In particular, the solder balls become smaller in diameter with narrowing of the electrode pitch. Furthermore, when the solder balls are miniaturized to a size called solder powder, activity is required by the flux. On the other hand, in order to retain the solder balls, a viscosity capable of retaining the solder balls at ordinary temperature is required.

The present invention has been made to solve such problems, and an object thereof is to provide a flux which can ensure the wettability of solder, can ensure solder ball retention, and can realize low residue that enables suppression of the residue amount after soldering and use in applications in which the residues after soldering are not washed for use, and a solder paste using this flux.

It has been found that an organic acid mixture including an organic acid with 10 or more carbon atoms or an organic acid with 12 or more carbon atoms can provide sufficient activity even when added in a small amount. Moreover, it has been found that the flux can have a predetermined viscosity by virtue of the inclusion of isobornyl cyclohexanol therein, even if it does not contain rosin.

Therefore, the present invention is a flux containing: 1 wt % or more and 15 wt % or less of an organic acid mixture including an organic acid with 10 or more carbon atoms; 50 wt % or more and 90 wt % or less of isobornyl cyclohexanol; and 5 wt % or more and 45 wt % or less of a different solvent, the flux being free of a thermosetting resin, wherein, when a total amount of the isobornyl cyclohexanol and the different solvent is 100 wt %, a ratio of the isobornyl cyclohexanol is 50 wt % or more and 95 wt % or less, and wherein the organic acid mixture including an organic acid with 10 or more carbon atoms includes 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid.

The organic acid mixture including an organic acid with 10 or more carbon atoms preferably includes 30 wt % or more and 60 wt % or less of 2-methylnonanedioic acid, 8 wt % or more and 20 wt % or less of 4-(methoxycarbonyl)-2,4-dimethylundecanedioic acid, 8 wt % or more and 20 wt % or less of 4,6-bis(methoxycarbonyl)-2,4,6-trimethyltridecanedioic acid, and 15 wt % or more and 30 wt % or less of 8,9-bis(methoxycarbonyl)-8,9-dimethylhexadecanedioic acid, when a total amount of the organic acid mixture is 100 wt %.

Further, the present invention is a flux containing: 1 wt % or more and 15 wt % or less of an organic acid with 12 or more carbon atoms; 50 wt % or more and 90 wt % or less of isobornyl cyclohexanol; and 5 wt % or more and 45 wt % or less of a different solvent, the flux being free of a thermosetting resin, wherein, when the total amount of the isobornyl cyclohexanol and the different solvent is 100 wt %, the ratio of the isobornyl cyclohexanol is 50 wt % or more and 95 wt % or less.

The organic acid with 12 or more carbon atoms is preferably any one of: a dimer acid which is a reaction product of oleic acid and linoleic acid, a trimer acid which is a reaction product of oleic acid and linoleic acid, a hydrogenated dimer acid obtained by adding hydrogen to (hydrogenating) the dimer acid which is a reaction product of oleic acid and linoleic acid, and a hydrogenated trimer acid obtained by adding hydrogen to (hydrogenating) the trimer acid which is a reaction product of oleic acid and linoleic acid; or two or more of: a dimer acid which is a reaction product of oleic acid and linoleic acid, a trimer acid which is a reaction product of oleic acid and linoleic acid, a hydrogenated dimer acid obtained by adding hydrogen to (hydrogenating) the dimer acid which is a reaction product of oleic acid and linoleic acid, and a hydrogenated trimer acid obtained by adding hydrogen to (hydrogenating) the trimer acid which is a reaction product of oleic acid and linoleic acid.

Preferably, the flux of the present invention further contains: 0 wt % or more and 15 wt % or less of an organic acid with less than 12 carbon atoms; 0 wt % or more and 5 wt % or less of an amine; 0 wt % or more and 1 wt % or less of an amine hydrohalide; and/or 0 wt % or more and 5 wt % or less of an organohalogen compound.

Moreover, the present invention is a solder paste including the flux described above and metal powder.

In the present invention, the flux contains: 1 wt % or more and 15 wt % or less of an organic acid mixture including an organic acid with 10 or more carbon atoms; 50 wt % or more and 90 wt % or less of isobornyl cyclohexanol; and 5 wt % or more and 45 wt % or less of a different solvent. When the total amount of the isobornyl cyclohexanol and the different solvent is 100 wt %, the ratio of the isobornyl cyclohexanol is 50 wt % or more and 95 wt % or less, and the organic acid mixture including an organic acid with 10 or more carbon atoms includes 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid. By virtue of this structure, the wettability of the solder can be obtained. Further, it is possible to suppress the residue amount to realize low residue. Furthermore, when placing a solder ball on an electrode coated with the flux of the present invention to form a solder bump, the solder ball can be retained with the flux at ordinary temperature before heating.

Further, in the present invention, the flux contains: 1 wt % or more and 15 wt % or less of an organic acid with 12 or more carbon atoms; 50 wt % or more and 90 wt % or less of isobornyl cyclohexanol; and 5 wt % or more and 45 wt % or less of a different solvent. When the total amount of the isobornyl cyclohexanol and the different solvent is 100 wt %, the ratio of the isobornyl cyclohexanol is 50 wt % or more and 95 wt % or less. By virtue of this, the wettability of the solder can be obtained. Further, it is possible to suppress the residue amount to realize low residue. Furthermore, when placing a solder ball on an electrode coated with the flux of the present invention to form a solder bump, the solder ball can be retained with the flux at ordinary temperature before heating.

<Example of Flux According to Present Embodiment>

The flux of the present embodiment contains an organic acid mixture including an organic acid with 10 or more carbon atoms, isobornyl cyclohexanol as a solvent, and a different solvent. It does not contain rosin. The organic acid mixture includes 2-methylnonanedioic acid with 10 carbon atoms, 4-(methoxycarbonyl)-2,4-dimethylundecanedioic acid with 15 carbon atoms, 4,6-bis(methoxycarbonyl)-2,4,6-trimethyltridecanedioic acid having 20 carbon atoms, and 8,9-bis(methoxycarbonyl)-8,9-dimethylhexadecanedioic acid having 20 carbon atoms.

The organic acid mixture including 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid has heat resistance to heating up to a temperature range assumed for soldering, is hardly volatile, and acts as an activator during soldering.

In order to realize a low residue flux, the flux contains neither rosin nor a resin such as a thermosetting resin. If all the components are configured to be easily volatilized, the organic acid would also be designed to volatilize during reflow, and the flux cannot be protected by a heat-resistant component such as a resin represented by rosin. Therefore, especially an organic acid having a small number of carbon atoms would volatilize and decompose.

In contrast, 2-methylnonanedioic acid, 4-(methoxycarbonyl)-2,4-dimethylundecanedioic acid, 4,6-bis(methoxycarbonyl)-2,4,6-trimethyltridecanedioic acid and 8,9-bis(methoxycarbonyl)-8,9-dimethylhexadecanedioic acid have a high molecular weight, heat resistance, and activity even in a relatively small amount, and thus improve solder wettability.

Hence, the organic acid mixture including 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid functions as an activator during soldering even if the amount thereof contained in the flux is small. Further, since the amount of the organic acid mixture in the flux is small, it is possible to suppress the residue amount after soldering to realize low residue, and also to use the flux in applications in which the residues after soldering are not washed for use.

When the added amount of the organic acid mixture including 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid is large, the residue amount after soldering increases.

Therefore, the organic acid mixture including 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid is contained in an amount of 1 wt % or more and 15 wt % or less.

In addition, the flux containing an organic acid mixture including an organic acid with 10 or more carbon atoms, according to the present embodiment, contains 50 wt % or more and 90 wt % or less of isobornyl cyclohexanol in consideration of the solder ball retention when used in applications for forming solder bumps. However, if the solvent is only isobornyl cyclohexanol, the viscosity of the flux will become too high. Therefore, a different solvent is contained in an amount of 5 wt % or more and 45 wt % or less, and the ratio of isobornyl cyclohexanol is 50 wt % or more and 95 wt % or less when the total amount of isobornyl cyclohexanol and the different solvent is 100 wt %.

The flux of the present embodiment contains an organic acid with 12 or more carbon atoms, isobornyl cyclohexanol as a solvent, and a different solvent. It does not contain rosin. An organic acid with 12 or more carbon atoms has a high molecular weight and heat resistance to heating up to a temperature range assumed for soldering, is hardly volatile, and has activity even in a relatively small amount, so that the solder wettability is improved.

As a result, the organic acid with 12 or more carbon atoms functions as an activator during soldering even if the amount thereof contained in the flux is small. Further, since the amount of the organic acid in the flux is small, it is possible to suppress the residue amount after soldering to realize low residue, and also to use the flux in applications in which the residues after soldering are not washed for use.

When the added amount of the organic acid with 12 or more carbon atoms is large, the residue amount after soldering increases. Therefore, the flux of the present embodiment contains 1 wt % or more and 15 wt % or less of an organic acid with 12 or more carbon atoms.

The organic acid with 12 or more carbon atoms is dodecanedioic acid with 12 carbon atoms. The organic acid with 12 or more carbon atoms is 12-hydroxystearic acid with 18 carbon atoms. Further, the organic acid with 12 or more carbon atoms is a dimer acid which is a reaction product of oleic acid and linoleic acid, a trimer acid which is a reaction product of oleic acid and linoleic acid, a hydrogenated dimer acid obtained by adding hydrogen to (hydrogenating) the dimer acid which is a reaction product of oleic acid and linoleic acid, or a hydrogenated trimer acid obtained by adding hydrogen to (hydrogenating) the trimer acid which is a reaction product of oleic acid and linoleic acid.

The dimer acid of the present embodiment is a reaction product of oleic acid and linoleic acid, which is a dimer with 36 carbon atoms. The trimer acid of the present embodiment is a reaction product of oleic acid and linoleic acid, which is a trimer with 54 carbon atoms.

Dodecanedioic acid, 12-hydroxystearic acid, a dimer acid which is a reaction product of oleic acid and linoleic acid, a trimer acid which is a reaction product of oleic acid and linoleic acid, a hydrogenated dimer acid obtained by adding hydrogen to (hydrogenating) the dimer acid which is a reaction product of oleic acid and linoleic acid, or a hydrogenated trimer acid obtained by adding hydrogen to (hydrogenating) the trimer acid which is a reaction product of oleic acid and linoleic acid has a high molecular weight, heat resistance to the temperature range assumed for soldering, and activity even in a relatively small amount. Therefore, solder wettability is improved.

Thus, dodecanedioic acid, 12-hydroxystearic acid, a dimer acid which is a reaction product of oleic acid and linoleic acid, a trimer acid which is a reaction product of oleic acid and linoleic acid, a hydrogenated dimer acid obtained by adding hydrogen to (hydrogenating) the dimer acid which is a reaction product of oleic acid and linoleic acid, or a hydrogenated trimer acid obtained by adding hydrogen to (hydrogenating) the trimer acid which is a reaction product of oleic acid and linoleic acid functions as an activator during soldering even if the amount contained in the flux is small. In addition, since the amount of the respective acids in the flux is small, the residue amount after soldering can be suppressed to realize low residue, which can be used in applications in which residues after soldering are not washed for use.

Even in the case where the organic acid with 12 or more carbon atoms is dodecanedioic acid, 12-hydroxystearic acid, a dimer acid which is a reaction product of oleic acid and linoleic acid, a trimer acid which is a reaction product of oleic acid and linoleic acid, a hydrogenated dimer acid obtained by adding hydrogen to (hydrogenating) the dimer acid which is a reaction product of oleic acid and linoleic acid, or a hydrogenated trimer acid obtained by adding hydrogen to (hydrogenating) the trimer acid which is a reaction product of oleic acid and linoleic acid, when the amount thereof to be added is large, the residue amount after soldering increases.

Therefore, any one of dodecanedioic acid, 12-hydroxystearic acid, a dimer acid which is a reaction product of oleic acid and linoleic acid, a trimer acid which is a reaction product of oleic acid and linoleic acid, a hydrogenated dimer acid obtained by adding hydrogen to (hydrogenating) the dimer acid which is a reaction product of oleic acid and linoleic acid, and a hydrogenated trimer acid obtained by adding hydrogen to (hydrogenating) the trimer acid which is a reaction product of oleic acid and linoleic acid, or two or more of dodecanedioic acid, 12-hydroxystearic acid, a dimer acid which is a reaction product of oleic acid and linoleic acid, a trimer acid which is a reaction product of oleic acid and linoleic acid, a hydrogenated dimer acid obtained by adding hydrogen to (hydrogenating) the dimer acid which is a reaction product of oleic acid and linoleic acid, and a hydrogenated trimer acid obtained by adding hydrogen to (hydrogenating) the trimer acid which is a reaction product of oleic acid and linoleic acid is/are contained in a total amount of 1 wt % or more and 15 wt % or less.

The flux of the present embodiment containing an organic acid with 12 or more carbon atoms contains 50 wt % or more and 90 wt % or less of isobornyl cyclohexanol in consideration of the solder ball retention when used in applications for forming solder bumps. However, if the solvent is only isobornyl cyclohexanol, the viscosity of the flux will become too high. Therefore, a different solvent is contained in an amount of 5 wt % or more and 45 wt % or less, and the ratio of isobornyl cyclohexanol is 50 wt % or more and 95 wt % or less when the total amount of isobornyl cyclohexanol and the different solvent is 100 wt %.

The flux of the present embodiment containing an organic acid mixture including an organic acid with 10 or more carbon atoms, containing isobornyl cyclohexanol in a solvent at a predetermined ratio, and free of rosin, or the flux of the present embodiment containing an organic acid with 12 or more carbon atoms, containing isobornyl cyclohexanol in a solvent at a predetermined ratio, and free of rosin contains 0 wt % or more and 15 wt % or less of a different volatile organic acid with less than 12 carbon atoms as an activator.

Further, the flux of the present embodiment containing an organic acid mixture including an organic acid with 10 or more carbon atoms, containing isobornyl cyclohexanol in a solvent at a predetermined ratio, and free of rosin, or the flux of the present embodiment containing an organic acid with 12 or more carbon atoms, containing isobornyl cyclohexanol in a solvent at a predetermined ratio, and free of rosin further contains 0 wt % or more and 5 wt % or less of an amine, 0 wt % or more and 1 wt % or less of an amine hydrohalide, and/or 0 wt % or more and 5 wt % or less of an organohalogen compound as activators.

In addition to the above, examples of the organic acid with 12 or more carbon atoms include lauric acid (12 carbon atoms), isocyanuric acid tris (2-carboxyethyl) (12 carbon atoms), dibutylaniline diglycolic acid (14 carbon atoms), palmitic acid (16 carbon atoms), stearic acid (18 carbon atoms), oleic acid (18 carbon atoms), linoleic acid (18 carbon atoms), linolenic acid (18 carbon atoms), and eicosane diacid (20 carbon atoms).

Further, examples of the organic acid with 12 or more carbon atoms include a dimer acid other than a reaction product of oleic acid and linoleic acid, a trimer acid other than a reaction product of oleic acid and linoleic acid, a hydrogenated dimer acid obtained by adding hydrogen to (hydrogenating) the dimer acid other than a reaction product of oleic acid and linoleic acid, or a hydrogenated trimer acid obtained by adding hydrogen to (hydrogenating) a trimer acid other than a reaction product of oleic acid and linoleic acid, including a dimer acid which is a reaction product of oleic acid, a trimer acid which is a reaction product of oleic acid, a dimer acid which is a reaction product of linoleic acid, a trimer acid which is a reaction product of linoleic acid, a dimer acid which is a reaction product of linolenic acid, a trimer acid which is a reaction product of linolenic acid, a dimer acid which is a reaction product of acrylic acid and oleic acid, a trimer acid which is a reaction product of acrylic acid and oleic acid, a dimer acid which is a reaction product of acrylic acid and linoleic acid, a trimer acid which is a reaction product of acrylic acid and linoleic acid, a dimer acid which is a reaction product of acrylic acid and linolenic acid, a trimer acid which is a reaction product of acrylic acid and linolenic acid, a dimer acid which is a reaction product of methacrylic acid and oleic acid, a trimer acid which is a reaction product of methacrylic acid and oleic acid, a dimer acid which is a reaction product of methacrylic acid and linoleic acid, a trimer acid which is a reaction product of methacrylic acid and linoleic acid, a dimer acid which is a reaction product of methacrylic acid and linolenic acid, a trimer acid which is a reaction product of methacrylic acid and linolenic acid, a dimer acid which is a reaction product of oleic acid and linolenic acid, a trimer acid which is a reaction product of oleic acid and linolenic acid, a dimer acid which is a reaction product of linoleic acid and linolenic acid, a trimer acid which is a reaction product of linoleic acid and linolenic acid, a hydrogenated dimer acid obtained by adding hydrogen to (hydrogenating) the dimer acid other than the reaction product of oleic acid and linoleic acid listed above, and a hydrogenated trimer acid obtained by adding hydrogen to (hydrogenating) a trimer acid other than the reaction product of oleic acid and linoleic acid listed above.

Examples of the organic acid with less than 12 carbon atoms include glycolic acid (2 carbon atoms), thioglycolic acid (2 carbon atoms), glycine (2 carbon atoms), malonic acid (3 carbon atoms), fumaric acid (4 carbon atoms), maleic acid (4 carbon atoms), succinic acid (4 carbon atoms), diglycolic acid (4 carbon atoms), tartaric acid (4 carbon atoms), malic acid (4 carbon atoms), glutaric acid (5 carbon atoms), 2,2-bis(hydroxymethyl) propionic acid (5 carbon atoms), adipic acid (6 carbon atoms), citric acid (6 carbon atoms), picolinic acid (6 carbon atoms), benzoic acid (6 carbon atoms), 2,2-bis(hydroxymethyl) butanoic acid (6 carbon atoms), salicylic acid (7 carbon atoms), dipicolinic acid (7 carbon atoms), 2,3-dihydroxybenzoic acid (7 carbon atoms), 3-hydroxybenzoic acid (7 carbon atoms), suberic acid (8 carbon atoms), phthalic acid (8 carbon atoms), isophthalic acid (8 carbon atoms), terephthalic acid (8 carbon atoms), parahydroxyphenylacetic acid (8 carbon atoms), 1,3-cyclohexanedicarboxylic acid (8 carbon atoms), p-anisic acid (8 carbon atoms), azelaic acid (9 carbon atoms), 2,4-diethylglutaric acid (9 carbon atoms), sebacic acid (10 carbon atoms), phenyl succinic acid (10 carbon atoms), 2-quinolinecarboxylic acid (10 carbon atoms), and 4-tert-butylbenzoic acid (11 carbon atoms).

The different solvent preferably has a viscosity lower than that of isobornyl cyclohexanol at ordinary temperature, and examples thereof include water, alcohol solvents, glycol ether solvents and terpineols. Examples of the alcohol solvents include industrial ethanol (mixed solvent obtained by adding methanol and/or isopropyl alcohol to ethanol), isopropyl alcohol, 1,2-butanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 1,1,1-tris(hydroxymethyl)ethane, 2-ethyl-2-hydroxymethyl-1,3-propanediol, 2,2'-oxybis(methylene)bis(2-ethyl-1,3-propanediol), 2,2-bis(hydroxymethyl)-1,3-propanediol, 1,2,6-trihydroxyhexane, bis[2,2,2-tris(hydroxymethyl)ethyl] ether, 1-ethynyl-1-cyclohexanol, 1,4-cyclohexanediol, 1,4-cyclohexanedimethanol, erythritol, threitol, guaiacol glycerol ether, 3,6-dimethyl-4-octin-3,6-diol, and 2,4,7,9-tetramethyl-5-decyne-4,7-diol. Examples of the glycol ether solvents include hexyl diglycol, diethylene glycol mono-2-ethyl hexyl ether, ethylene glycol monophenyl ether, 2-methylpentane-2,4-diol, diethylene glycol dibutyl ether, and triethylene glycol monobutyl ether.

Examples of the amine include monoethanolamine, diphenylguanidine, ethylamine, triethylamine, ethylenediamine, triethylenetetramine, 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo [1,2-a]benzimidazole, 1-dodecyl-2-methyl-3-benzylimidazolium chloride, 2-methylimidazoline, 2-phenylimidazoline, 2,4-diamino-6-vinyl-s-triazine, 2,4-diamino-6-vinyl-s-triazine isocyanuric acid adduct, 2,4-diamino-6-methacryloyloxyethyl-s-triazine, epoxy-imidazole adduct, 2-methylbenzimidazole, 2-octylbenzimidazole, 2-pentylbenzimidazole, 2-(1-ethylpentyl)benzimidazole, 2-nonylbenzimidazole, 2-(4-thiazolyl)benzimidazole, benzimidazole, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], 6-(2-benzotriazolyl)-4-tert-octyl-6'-tert-butyl-4'-methyl-2, 2'-methylene bisphenol, 1,2,3-benzotriazole, 1-[N,N-bis(2- ethylhexyl)aminomethyl]benzotriazole, carboxybenzotriazole, 1-[N,N-bis(2-ethylhexyl)aminomethyl]methyl benzotriazole, 2,2'-[[(methyl-1H-benzotriazol-1-yl)methyl]imino]bisethanol, 1-(1',2'-dicarboxyethyl)benzotriazole, 1-(2,3-dicarboxypropyl)benzotriazole, 1-[(2-ethylhexylamino) methyl]benzotriazole, 2,6-bis [(1H-benzotriazol-1-yl)methyl]-4-methylphenol, 5-methyl benzotriazole, and 5-phenyltetrazole.

Examples of the organohalogen compound include organic bromo compounds such as trans-2,3-dibromo-1,4-butenediol, triallyl isocyanurate hexabromide, 1-bromo-2-butanol, 1-bromo-2-propanol, 3-bromo-1-propanol, 3-bromo-1,2-propanediol, 1,4-dibromo-2-butanol, 1,3-dibromo-2-propanol, 2,3-dibromo-1-propanol, 2,3-dibromo-1,4-butanediol, 2,3-dibromo-2-butene-1,4-diol, trans-2,3-dibromo-2-butene-1,4-diol, cis-2,3-dibromo-2-butene-1,4-diol, tetrabromophthalic acid, and bromosuccinic acid. Moreover, there are listed: organic chloro compounds including chloroalkane, chlorinated fatty acid ester, het acid, and het anhydride. Furthermore, there are listed: organic fluoro compounds including a fluorosurfactant, a surfactant having a perfluoroalkyl group, and polytetrafluoroethylene.

The amine hydrohalide is a compound obtained by causing an amine and hydrogen halide to react, and examples thereof include aniline hydrochloride and aniline hydrobromide. As the amine of the amine hydrohalide, the above-described amines can be used, and examples thereof include ethylamine, ethylenediamine, triethylamine, methylimidazole, and 2-ethyl-4-methylimidazole. Examples of the hydrogen halide include hydrides of chlorine, bromine, iodine, and fluorine (hydrogen chloride, hydrogen bromide, hydrogen iodide, and hydrogen fluoride). Moreover, a borofluoride may be contained in place of or in combination with the amine hydrohalide, and examples of the borofluoride include fluoroboric acid.

<Example of Solder Paste of Present Embodiment>

As described above, the solder paste of the present embodiment contains: a flux containing an organic acid mixture including an organic acid with 10 or more carbon atoms, containing isobornyl cyclohexanol in a solvent at a predetermined ratio, and free of rosin; or a flux containing an organic acid with 12 or more carbon atoms, containing isobornyl cyclohexanol in a solvent at a predetermined ratio, and free of rosin; and metal powder. The metal powder is preferably Pb-free solder, and contains solder powder containing: Sn metal; Sn—Ag, Sn—Cu, Sn—Ag—Cu, Sn—Bi, Sn—In, or the like; or a product obtained by adding Sb, Bi, In, Cu, Zn, As, Ag, Cd, Fe, Ni, Co, Au, Ge, P, or the like to any of these alloys.

<Action/Effect Example of Flux and Solder Paste of Present Embodiment>

The flux containing: 1 wt % or more and 15 wt % or less of an organic acid mixture including an organic acid with 10 or more carbon atoms; 50 wt % or more and 90 wt % or less of isobornyl cyclohexanol; and 5 wt % or more and 45 wt % or less of a different solvent, wherein, when the total amount of the isobornyl cyclohexanol and the different solvent is 100 wt %, the ratio of the isobornyl cyclohexanol is 50 wt % or more and 95 wt % or less, and wherein the organic acid mixture including an organic acid with 10 or more carbon atoms includes 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid, and the solder paste using the flux can provide wettability of the solder. Further, it is possible to suppress the residue amount to realize low residue.

Further, the flux containing: 1 wt % or more and 15 wt % or less of an organic acid with 12 or more carbon atoms; 50 wt % or more and 90 wt % or less of isobornyl cyclohexanol; and 5 wt % or more and 45 wt % or less of a different solvent, wherein, when the total amount of the isobornyl cyclohexanol and the different solvent is 100 wt %, the ratio of the isobornyl cyclohexanol is 50 wt % or more and 95 wt % or less, and the solder paste using the flux can provide wettability of the solder. Further, it is possible to suppress residue amount to realize low residue.

In the flux of each embodiment, isobornyl cyclohexanol is contained in an amount of 50 wt % or more and 90 wt % or less when the total amount of the flux is 100 wt %, and the ratio of isobornyl cyclohexanol is 50 wt % or more and 95 wt % or less when the total amount of isobornyl cyclohexanol and a different solvent is 100 wt %. Hence, the flux has a viscosity capable of retaining the solder ball at ordinary temperature. By virtue of this, in the case where the flux of each embodiment is applied to electrodes and solder balls are placed on the electrodes coated with the flux to form solder bumps, it is possible to retain the solder balls with the flux at ordinary temperature before heating, and to suppress the occurrence of ball missing.

EXECUTED EXAMPLES

Fluxes of Executed Examples and Comparison Examples were prepared with the compositions shown in Tables 1 and 2 below to verify the solder wet spreadability, the solder ball retention, and the residue amount. The composition rates in Tables 1 and 2 are expressed in wt (weight) % when the total amount of flux is 100, excluding the ratio of isobornyl cyclohexanol.

<Evaluation of Solder Wet Spreadability>
(1) Verification Method

Each of the fluxes of the Examples and the Comparative Examples was printed on a Cu plate with a diameter φ of 0.34 mm and a thickness t=0.2 mm. Then, solder balls made of solder containing 3 wt % of Ag, 0.5 wt % of Cu, and the balance Sn (Sn-3Ag-0.5Cu) were mounted. The solder balls each have a diameter φ of 0.3 mm. The number of targets to be evaluated is 50 in each Example and each Comparative Example. The test objects made as described above were heated up to from 25° C. to 250° C. in a $N_2$ atmosphere at a temperature rising rate of 5° C./sec using a reflow furnace. Then, the wet spreading diameter of the molten solder was measured.

(2) Criterion for Determination
  ○: The wet spreading diameter was 350 μm or more.
  x: The wet spreading diameter was less than 350 μm.

<Evaluation of Solder Ball Retention>
(1) Verification Method

Flux printing of each Example and each Comparative Example was performed on a Cu electrode of φ 0.24 mm SRO (solder resist opening diameter) at a thickness t=0.2 mm, and Sn-3Ag-0.5Cu solder balls of φ 0.3 mm were mounted thereon, and then it was confirmed whether the balls were retained.

(2) Criterion for Determination
  ○: The solder balls were retained at the mounting position at room temperature and retained on the electrode portion.
  x: The solder balls were not retained at the mounting position at room temperature and flowed outside the electrodes.

<Evaluation of Residue Amount>
(1) Verification Method

As a test evaluation method by the TG method (thermogravimetry), an aluminum pan was filled with 10 mg of each of the fluxes of Examples and Comparative Examples, and TGD9600 manufactured by ULVAC was used for heating up to from 25° C. to 250° C. in a $N_2$ atmosphere at a temperature rising rate of 1° C./sec. It was measured whether the weight of each of the fluxes after heating arrived at 15% or less of the weight before heating.

(2) Criterion for Determination

○: The weight was 15% or less of the weight before heating.

x: The weight was greater than 15% of the weight before heating.

The flux whose weight after heating is 15% or less of the weight before heating can be said to be a flux that does not require washing after reflow because the components in the flux are sufficiently volatilized by heating. It can be said that, in the flux whose weight was greater than 15% of the weight before heating, the components in the flux were insufficiently volatilized. If the components in the flux are insufficiently volatilized, resulting in a large amount of residues, it may cause poor conductivity due to moisture absorption or the like.

<Comprehensive Evaluation>

○: All of the wet spreading evaluation, the solder ball retention property evaluation, and the residue amount evaluation were 0.

x: Any or all of the wet spreading evaluation, the solder ball retention property evaluation, and the residue amount evaluation was/were x.

TABLE 1

| | | Material | Number of carbon atoms | Executed Example 1 | Executed Example 2 | Executed Example 3 | Executed Example 4 | Executed Example 5 | Executed Example 6 | Executed Example 7 |
|---|---|---|---|---|---|---|---|---|---|---|
| Organic acid | Hardly volatile organic acid | Organic acid mixture | — | 5 | 5 | 5 | 15 | 10 | 3 | 1 |
| | | Dodecanedioic acid | 12 | | | | | | | |
| | | 12-Hydroxystearic acid | 18 | | | | | | | |
| | | Dimer acid | 36 | | | | | | | |
| | | Hydrogenated dimer acid | 36 | | | | | | | |
| | | Trimer acid | 54 | | | | | | | |
| | | Hydrogenated trimer acid | 54 | | | | | | | |
| | Volatile organic acid | Glycolic acid | 4 | | | | | | | |
| | | Glutaric acid | 5 | | | | | | | |
| Rosin | | Polymerized rosin | — | | | | | | | |
| Epoxy resin | | Bisphenol A epoxy resin | — | | | | | | | |
| Amine | | 2-Phenylimidozole | — | | | | | 5 | | 1 |
| | | 2-Ethylaminoethanol | — | | | | | | | |
| Halogen | Amine hydrohalide | Diphenylguanidine-HBr | — | | | | | | | |
| | Organohalogen compound | Trans-2,3-dibromo-2-butene-1,4-diol | — | | | | | | | |
| Solvent | Isobornyl cyclohexanol | Isobomylcyclohexnol | — | 75 | 90 | 50 | 65 | 65 | 77 | 78 |
| | Different solvent | 1,3-Butylen glycol | | 20 | 5 | 45 | 20 | 20 | 20 | 20 |
| | Solvent ratio | Ratio of isobornyl cyclohexal in all solvents | — | 78.9% | 94.7% | 52.6% | 76.5% | 76.5% | 79.4% | 79.6% |
| Solder wet spreadability | | | | ○ | ○ | ○ | ○ | ○ | ○ | ○ |
| Solder ball retention | | | | ○ | ○ | ○ | ○ | ○ | ○ | ○ |
| Low residue | | | | ○ | ○ | ○ | ○ | ○ | ○ | ○ |
| Comprehensive evaluation | | | | ○ | ○ | ○ | ○ | ○ | ○ | ○ |

| | | Material | Number of carbon atoms | Executed Example 8 | Executed Example 9 | Executed Example 10 | Executed Example 11 | Executed Example 12 | Executed Example 13 | Executed Example 14 |
|---|---|---|---|---|---|---|---|---|---|---|
| Organic acid | Hardly volatile organic acid | Organic acid mixture | — | 1 | 1 | 1 | 5 | 5 | 5 | |
| | | Dodecanedioic acid | 12 | | | | | | | 5 |
| | | 12-Hydroxystearic acid | 18 | | | | | | | |
| | | Dimer acid | 36 | | | | | | | |
| | | Hydrogenated dimer acid | 306 | | | | | | | |
| | | Trimer acid | 54 | | | | | | | |
| | | Hydrogenated trimer acid | 54 | | | | | | | |
| | Volatile organic acid | Glycolic acid | 4 | 1 | 1 | | | | | |
| | | Glutaric acid | 5 | | | 1 | | | | |
| Rosin | | Polymerized rosin | — | | | | | | | |
| Epoxy resin | | Bisphenol A epoxy resin | — | | | | | | | |
| Amine | | 2-Phenylimidozole | — | 1 | 1 | 1 | 0.5 | 5 | | |
| | | 2-Ethylaminoethanol | — | | | | | | 5 | |
| Halogen | Amine hydrohalide | Diphenylguanidine-HBr | — | | 1 | | | | | |

TABLE 1-continued

| | | | | | | | | | | |
|---|---|---|---|---|---|---|---|---|---|---|
| Solvent | Organohalogen compound | Trans-2,3-dibromo-2-butene-1,4-diol | — | | 5 | | | | | |
| | Isonornyl cylohexanol | Isobornyl cyclohexanol | — | 76 | 72 | 77 | 74.5 | 70 | 70 | 75 |
| | Different solvent | 1,3-Butylene glycol | — | 20 | 20 | 20 | 20 | 20 | 20 | 20 |
| | Solvent ratio | Ratio of isobornyl cyclohexanol in all solvents | — | 79.2% | 78.3% | 79.4% | 78.8% | 77.8% | 77.8% | 78.9% |
| Solder wet spreadability | | | | ○ | ○ | ○ | ○ | ○ | ○ | ○ |
| Solder ball retention | | | | ○ | ○ | ○ | ○ | ○ | ○ | ○ |
| Low residue | | | | ○ | ○ | ○ | ○ | ○ | ○ | ○ |
| Comprehensive evaluation | | | | ○ | ○ | ○ | ○ | ○ | ○ | ○ |

| | | Material | Number of carbon atoms | Executed Example 15 | Executed Example 16 | Executed Example 17 | Executed Example 18 | Executed Example 19 |
|---|---|---|---|---|---|---|---|---|
| Oganic acid | Hardly volatile organic acid | Organic acid mixture | — | | | | | |
| | | Dodecanedioic acid | 12 | | | | | |
| | | 12-Hydroxystearic acid | 18 | 5 | | | | |
| | | Dimer acid | 36 | | 5 | | | |
| | | Hydrogenated dimer acid | 36 | | | 5 | 5 | 5 |
| | | Trimerr acid | 54 | | | | | |
| | | Hydrogenated trimer acid | 54 | | | | | |
| | Volatile organic acid | Glycolic acid | 4 | | | | | |
| | | Glutaric acid | 5 | | | | | |
| Rosin | | Polymerized rosin | — | | | | | |
| Epoxy resin | | Bisphenol A epoxy resin | — | | | | | |
| Amine | | 2-Phenylimidozole | — | | | | | |
| | | 2-Ethylaminoethanol | — | | | | | |
| Halogen | Amine hydrohalide | Diphenylguanidine-HBr | — | | | | | |
| | Organohalogen compound | Trans-2,3-dibromo-2-butene-1,4-diol | — | | | | | |
| Solvent | Isobornyl cyclohexanol | Isobornyl cyclohexanol | — | 75 | 75 | 75 | 90 | 50 |
| | Different solvent | 1,3-Butylene glycol | — | 20 | 20 | 20 | 5 | 45 |
| | Solvent ratio | Ratio of isobornyl cyclohexanol in all solvents | — | 78.9% | 78.9% | 78.9% | 94.7% | 52.6% |
| Solder wet spreadability | | | | ○ | ○ | ○ | ○ | ○ |
| Solder ball retention | | | | ○ | ○ | ○ | ○ | ○ |
| Low residue | | | | ○ | ○ | ○ | ○ | ○ |
| Comprehensive evaluation | | | | ○ | ○ | ○ | ○ | ○ |

TABLE 2

| | | Material | Number of carbon atoms | Executed Example 20 | Executed Example 21 | Executed Example 22 | Executed Example 23 | Executed Example 24 | Executed Example 25 |
|---|---|---|---|---|---|---|---|---|---|
| Oganic acid | Hardly volatile organic acid | Organic acid mixture | — | | | | | | |
| | | Dodecanedioic acid | 12 | | | | | | |
| | | 12-Hydroxystearic acid | 18 | | | | | | |
| | | Dimer acid | 36 | | | | | | |
| | | Hydrogenated dimer acid | 36 | 15 | 10 | 3 | 1 | 1 | 1 |
| | | Trimer acid | 54 | | | | | | |
| | | Hydrogenated trimer acid | 54 | | | | | | |
| | Volatile organic acid | Glycolic acid | 4 | | | | | 1 | 1 |
| | | Glutaric acid | 5 | | | | | | |
| Rosin | | Polymerized rosin | — | | | | | | |
| Epoxy resin | | Bisphenol A epoxy resin | — | | | | | | |
| Amine | | 2-Phenylimidozole | — | | 5 | | 1 | 1 | 1 |
| | | 2-Ethylaminoethanol | — | | | | | | |
| Halogenn | Amine hydro | Diphenylguanidine-HBr | — | | | | | 1 | |
| | Organohalogen compound | Trans-2,3-dibromo-2-butene-1,4-diol | — | | | | | | 5 |
| Solvent | Isobornyl cyclohexanol | Isobornyl cyclohexanol | — | 65 | 65 | 77 | 78 | 76 | 72 |
| | Different solvent | 1,3-Butylene glycol | — | 20 | 20 | 20 | 20 | 20 | 20 |

TABLE 2-continued

| | | | | | | | | | |
|---|---|---|---|---|---|---|---|---|---|
| | Solvent ratio | Ratio of isobornyl cyclohex in all solvents | — | 76.5% | 76.5% | 79.4% | 79.6% | 79.2% | 78.3% |
| Solder wet spreadability | | | | ○ | ○ | ○ | ○ | ○ | ○ |
| Solder ball retention | | | | ○ | ○ | ○ | ○ | ○ | ○ |
| Low residue | | | | ○ | ○ | ○ | ○ | ○ | ○ |
| Comprehensive evaluation | | | | ○ | ○ | ○ | ○ | ○ | ○ |

| | | Material | Number of carbon atoms | Executed Example 26 | Executed Example 27 | Executed Example 28 | Executed Example 29 | Executed Example 30 | Executed Example 31 |
|---|---|---|---|---|---|---|---|---|---|
| Oganic acid | Hardly volatile organic acid | Organic acid mixture | — | | | | | | |
| | | Dodecanedioic acid | 12 | | | | | | |
| | | 12-Hydroxystearic acid | 18 | | | | | | |
| | | Dimer acid | 36 | | | | | | |
| | | Hydrogenated trimer acid | 36 | 1 | 5 | 5 | 5 | | |
| | | Trimer acid | 54 | | | | | 5 | |
| | | Hydrogenated trimer acid | 54 | | | | | | 5 |
| | Volatile organic acid | Glycolic acid | 4 | | | | | | |
| | | Glutaric acid | 5 | 1 | | | | | |
| Rosin | | Polymerized rosin | — | | | | | | |
| Epoxy resin | | Bisphenol A epoxy resin | — | | | | | | |
| Amine | | 2-Phenylimidozole | — | 1 | 0.5 | 5 | | | |
| | | 2-Ethylaminoethanol | — | | | | 5 | | |
| Halogen | Amine hydrohalide | Diphenylguanidine-HBr | — | | | | | | |
| | Organohalogen compound | Trans-2,3-dibromo-2-butene-1,4-diol | — | | | | | | |
| Solvent | Isobornyl cyclohexanol | Isobornyl cyclohexanol | — | 77 | 74.5 | 70 | 70 | 75 | 75 |
| | Different solvent | 1,3-Butylene glycol | — | 20 | 20 | 20 | 20 | 20 | 20 |
| | Solvent ratio | Ratio of isobornyl cyclohexanol in all solvents | — | 79.4% | 78.8% | 77.8% | 77.8% | 78.9% | 78.9% |
| Solder wet spreadability | | | | ○ | ○ | ○ | ○ | ○ | ○ |
| Solder ball retention | | | | ○ | ○ | ○ | ○ | ○ | ○ |
| Low residue | | | | ○ | ○ | ○ | ○ | ○ | ○ |
| Comprehensive evaluation | | | | ○ | ○ | ○ | ○ | ○ | ○ |

| | | Material | Number of carbon atoms | Executed Example 32 | Comparison Example 1 | Comparison Example 2 | Comparison Example 3 |
|---|---|---|---|---|---|---|---|
| Oganic acid | Hardly volatile organic acid | Organic acid mixture | — | 5 | 20 | | |
| | | Dodecanedioic acid | 12 | | | | |
| | | 12-Hydroxystearic acid | 18 | | | | |
| | | Dimer acid | 36 | | | | |
| | | Hydrogenated dimer acid | 36 | | | | |
| | | Timer acid | 54 | | | | |
| | | Hydrogenated trimer acid | 54 | | | | |
| | Volatile organic acid | Glycolic acid | 4 | 15 | | 5 | 15 |
| | | Glutaric acid | 5 | | | | |
| Rosin | | Polymerized rosin | — | | | | |
| Epoxy resin | | Bisphenol A epoxy resin | — | | | | |
| Amine | | 2-Phenylimidozole | — | | | | |
| | | 2-Ethylaminoethanol | — | | | | |
| Halogen | Amine hydrohalide | Diphenylguanidine-HBr | — | | | | |
| | Organohalogen compound | Trans-2,3-dibromo-2-butene-1,4-diol | — | | | | |
| Solvent | Isobornyl cyclohexanol | Isoborynl cyclohexanol | — | 60 | 60 | 75 | 65 |
| | Different solvent | 1,3-Butylene glycol | — | 20 | 20 | 20 | 20 |
| | Solvent ratio | Ratio of isobornyl cyclohexnol in all solvents | — | 75.0% | 75.0% | 78.9% | 76.5% |
| Solder wet spreadability | | | | ○ | ○ | x | x |
| Solder ball retention | | | | ○ | ○ | ○ | ○ |
| Low residue | | | | ○ | x | ○ | ○ |
| Comprehensive evaluation | | | | ○ | x | x | x |

TABLE 2-continued

| | Material | | Number of carbon atoms | Comparison Example 4 | Comparison Example 5 | Comparison Example 6 |
|---|---|---|---|---|---|---|
| Oganic acid | Hardly volatile organic acid | Organic acid mixture | — | 5 | 5 | 5 |
| | | Dodecanedioic acid | 12 | | | |
| | | 12-Hydroxystearic acid | 18 | | | |
| | | Dimer acid | 36 | | | |
| | | Hydrogenated dimer acid | 36 | | | |
| | | Trimer acid | 54 | | | |
| | | Hydrogenated trimer acid | 54 | | | |
| | Volatile organic acid | Glycolic acid | 4 | | | |
| | | Glutaric acid | 5 | | | |
| Rosin | | Polymerized rosin | — | | 35 | |
| Epoxy resin | | Bisphenol A epoxy resin | — | | | 35 |
| Amine | | 2-Phenylimidozole | — | | | |
| | | 2-Ethylaminoethanol | — | | | |
| Halogen | Amine hydrohalide | Diphenylguanidine-HBr | — | | | |
| | Organohalogen compound | Trans-2,3-dibromo-2-butene-1,4-diol | — | | | |
| Solvent | Isobornyl cyclohexanol | Isobornyl cyclohexanol | — | | 40 | 40 |
| | Different solvent | 1,3-Butylene glycol | — | 95 | 20 | 20 |
| | Solvent ratio | Ratio of isobornyl cyclohexnol in all solvents | — | 0.0% | 66.7% | 66.7% |
| Solder wet spreadability | | | | ○ | ○ | ○ |
| Solder ball retention | | | | x | ○ | ○ |
| Low residue | | | | ○ | x | x |
| Comprehensive evaluation | | | | x | x | x |

As shown in Executed Example 1, the flux containing: an organic acid mixture including 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid as an organic acid mixture including an organic acid with 10 or more carbon atoms in an amount of 5 wt % within the range defined in the present invention; isobornyl cyclohexanol in an amount of 75 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 78.9 wt % within the range defined in the present invention, had 350 μm or more of the solder wet spreading diameter which showed good solder wet spreading to provide a sufficient solder wet spreading effect. Further, the viscosity of the flux at ordinary temperature before heating could be increased to such an extent that the solder balls could be retained, and the solder balls could be retained. Furthermore, when the residue amount was 15 wt % or less, and a sufficient effect of suppressing the residue amount to attain low residue was obtained. It was found that, in the evaluation of the solder ball retention, when the test objects of Executed Examples in which the solder balls were retained at the mounting position at room temperature and retained at the electrode portion were each heated up to from 25° C. to 250° C. in a N₂ atmosphere at a temperature rising rate of 5° C./sec using a reflow furnace, the flux was kept at a predetermined viscosity during the temperature rising process, and that the solder balls could be retained during heating.

As shown in Executed Example 2, the flux containing: an organic acid mixture including 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid as an organic acid mixture including an organic acid with 10 or more carbon atoms in an amount of 5 wt % within the range defined in the present invention; isobornyl cyclohexanol in an amount of 90 wt %, which was increased within the range defined in the present invention; and 1,3-butylene glycol as a different solvent in an amount of 5 wt %, which was decreased within the range defined in the present invention, wherein, when the total amount of isobornyl cyclohexanol and the different solvent was 100 wt %, the ratio of isobornyl cyclohexanol was 94.7 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 3, the flux containing: an organic acid mixture including 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid as an organic acid mixture including an organic acid with 10 or more carbon atoms in an amount of 5 wt % within the range defined in the present invention; isobornyl cyclohexanol in an amount of 50 wt %, which was decreased within the range defined in the present invention; and 1,3-butylene glycol as a different solvent in an amount of 45 wt %, which was increased within the range defined in the present invention, wherein, when the total amount of isobornyl cyclohexanol and the different solvent was 100 wt %, the ratio of isobornyl cyclohexanol was 52.6 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 4, the flux containing: an organic acid mixture including 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid as an organic acid mixture including an organic acid with 10 or more carbon atoms in an amount of 15 wt %, which was increased within the range defined in the present invention; isobornyl cyclohexanol in an amount of 65 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 76.5 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 5, the flux containing: an organic acid mixture including 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid as an organic acid mixture including an organic acid with 10 or more carbon atoms in an amount of 10 wt %, which was increased within the range defined in the present invention; further 2-phenylimidazole as an amine in an amount of 5 wt % within the range defined in the present invention; isobornyl cyclohexanol in an amount of 65 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 76.5 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 6, the flux containing: an organic acid mixture including 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid as an organic acid mixture including an organic acid with 10 or more carbon atoms in an amount of 3 wt %, which was decreased within the range defined in the present invention; isobornyl cyclohexanol in an amount of 77 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 79.4 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 7, the flux containing: an organic acid mixture including 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid as an organic acid mixture including an organic acid with 10 or more carbon atoms in an amount of 1 wt %, which was decreased within the range defined in the present invention; further 2-phenylimidazole as an amine in an amount of 1 wt % within the range defined in the present invention; isobornyl cyclohexanol in an amount of 78 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 79.6 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 8, the flux containing: an organic acid mixture including 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid as an organic acid mixture including an organic acid with 10 or more carbon atoms in an amount of 1 wt %, which was decreased within the range defined in the present invention; further glycolic acid with 4 carbon atoms as a different organic acid in an amount of 1 wt % within the range defined in the present invention; 2-phenylimidazole as a amine in an amount of 1 wt % within the range defined in the present invention; an amine hydrohalide as a halogen in an amount of 1 wt % within the range defined in the present invention; isobornyl cyclohexanol in an amount of 76 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 79.2 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 9, the flux containing: an organic acid mixture including 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid as an organic acid mixture including an organic acid with 10 or more carbon atoms in an amount of 1 wt %, which was decreased within the range defined in the present invention; further glycolic acid with 4 carbon atoms as a different organic acid in an amount of 1 wt % within the range defined in the present invention; 2-phenylimidazole as a amine in an amount of 1 wt % within the range defined in the present invention; an organohalogen compound as a halogen in an amount of 5 wt % within the range defined in the present invention; isobornyl cyclohexanol in an amount of 72 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 78.3 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 10, the flux containing: an organic acid mixture including 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid as an organic acid mixture including an organic acid with 10 or more carbon atoms in an amount of 1 wt %, which was decreased within the range defined in the present invention; further glutaric acid with 5 carbon atoms as a different organic acid in an amount of 1 wt % within the range defined in the present invention; 2-phenylimidazole as a amine in an amount of 1 wt % within the range defined in the present invention; isobornyl cyclohexanol in an amount of 77 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 79.4 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 11, the flux containing: an organic acid mixture including 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid as an organic acid mixture including an organic acid with 10 or more carbon atoms in an amount of 5 wt % within the range defined in the present invention; further 2-phenylimidazole as an amine in an amount of 0.5 wt % within the range defined in the present invention; isobornyl cyclohexanol in an amount of 74.5 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 78.8 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 12, the flux containing: an organic acid mixture including 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid as an organic acid mixture including an organic acid with 10 or more carbon atoms in an amount of 5 wt % within the range defined in the present invention; further 2-phenylimidazole as an amine in an amount of 5 wt %, which was increased within the range defined in the present invention; isobornyl cyclohexanol in an amount of 70 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 77.8 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 13, the flux containing: an organic acid mixture including 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid as an organic acid mixture including an organic acid with 10 or more carbon atoms in an amount of 5 wt % within the range defined in the present invention; further 2-ethylaminoethanol as an amine in an amount of 5 wt %, which was increased within the range defined in the present invention; isobornyl cyclohexanol in an amount of 70 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 77.8 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 14, the flux containing: dodecanedioic acid with 12 carbon atoms as an organic acid with 12 or more carbon atoms in an amount of 5 wt % within the range defined in the present invention; isobornyl cyclohexanol in an amount of 75 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 78.9 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 15, the flux containing: 12-hydroxystearic acid with 18 carbon atoms as an organic acid with 12 or more carbon atoms in an amount of 5 wt % within the range defined in the present invention; isobornyl cyclohexanol in an amount of 75 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 78.9 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 16, the flux containing: a dimer acid with 36 carbon atoms which was a reaction product of oleic acid and linoleic acid as an organic acid with 12 or more carbon atoms in an amount of 5 wt % within the range defined in the present invention; isobornyl cyclohexanol in an amount of 75 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 78.9 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 17, the flux containing: a hydrogenated dimer acid obtained by adding hydrogen to (hydrogenating) the dimer acid with 36 carbon atoms which was a reaction product of oleic acid and linoleic acid as an organic acid with 12 or more carbon atoms in an amount of 5 wt % within the range defined in the present invention; isobornyl cyclohexanol in an amount of 75 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 78.9 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 18, the flux containing: a hydrogenated dimer acid obtained by adding hydrogen to (hydrogenating) the dimer acid with 36 carbon atoms which was a reaction product of oleic acid and linoleic acid as an organic acid with 12 or more carbon atoms in an amount of 5 wt % within the range defined in the present invention; isobornyl cyclohexanol in an amount of 90 wt %, which was increased within the range defined in the present invention; and 1,3-butylene glycol as a different solvent in an amount of 5 wt %, which was decreased within the range defined in the present invention, wherein, when the total amount of isobornyl cyclohexanol and the different solvent was 100 wt %, the ratio of isobornyl cyclohexanol was 94.7 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 19, the flux containing: a hydrogenated dimer acid obtained by adding hydrogen to (hydrogenating) the dimer acid with 36 carbon atoms which was a reaction product of oleic acid and linoleic acid as an organic acid with 12 or more carbon atoms in an amount of 5 wt % within the range defined in the present invention; isobornyl cyclohexanol in an amount of 50 wt %, which was decreased within the range defined in the present invention; and 1,3-butylene glycol as a different solvent in an amount of 45 wt %, which was increased within the range defined in the present invention, wherein, when the total amount of isobornyl cyclohexanol and the different solvent was 100 wt %, the ratio of isobornyl cyclohexanol was 52.6 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 20, the flux containing: a hydrogenated dimer acid obtained by adding hydrogen to (hydrogenating) the dimer acid with 36 carbon atoms which was a reaction product of oleic acid and linoleic acid as an organic acid with 12 or more carbon atoms in an amount of 15 wt %, which was increased within the range defined in the present invention; isobornyl cyclohexanol in an amount of 65 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 76.5 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 21, the flux containing: a hydrogenated dimer acid obtained by adding hydrogen to (hydrogenating) the dimer acid with 36 carbon atoms which was a reaction product of oleic acid and linoleic acid as an organic acid with 12 or more carbon atoms in an amount of 10 wt %, which was increased within the range defined in the present invention; further 2-phenylimidazole as an amine in an amount of 5 wt % within the range defined in the present invention; isobornyl cyclohexanol in an amount of 65 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 76.5 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 22, the flux containing: a hydrogenated dimer acid obtained by adding hydrogen to (hydrogenating) the dimer acid with 36 carbon atoms which was a reaction product of oleic acid and linoleic acid as an organic acid with 12 or more carbon atoms in an amount of 3 wt %, which was decreased within the range defined in the present invention; isobornyl cyclohexanol in an amount of 77 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 79.4 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 23, the flux containing: a hydrogenated dimer acid obtained by adding hydrogen to (hydrogenating) the dimer acid with 36 carbon atoms which was a reaction product of oleic acid and linoleic acid as an organic acid with 12 or more carbon atoms in an amount of 1 wt %, which was decreased within the range defined in the present invention; further 2-phenylimidazole as an amine in an amount of 1 wt % within the range defined in the present invention; isobornyl cyclohexanol in an amount of 78 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 79.6 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 24, the flux containing: a hydrogenated dimer acid obtained by adding hydrogen to (hydrogenating) the dimer acid with 36 carbon atoms which was a reaction product of oleic acid and linoleic acid as an organic acid with 12 or more carbon atoms in an amount of 1 wt %, which was decreased within the range defined in the present invention; further glycolic acid with 4 carbon atoms as a different organic acid in an amount of 1 wt % within the range defined in the present invention; 2-phenylimidazole as an amine in an amount of 1 wt % within the range defined in the present invention; amine hydrohalide as a halogen in an amount of 1 wt % within the range defined in the present invention; isobornyl cyclohexanol in an amount of 76 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 79.2 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 25, the flux containing: a hydrogenated dimer acid obtained by adding hydrogen to (hydrogenating) the dimer acid with 36 carbon atoms which was a reaction product of oleic acid and linoleic acid as an organic acid with 12 or more carbon atoms in an amount of 1 wt %, which was decreased within the range defined in the present invention; further glycolic acid with 4 carbon atoms as a different organic acid in an amount of 1 wt % within the range defined in the present invention; 2-phenylimidazole as an amine in an amount of 1 wt % within the range defined in the present invention; an organohalogen compound as a halogen in an amount of 5 wt % within the range defined in the present invention; isobornyl cyclohexanol in an amount of 72 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 78.3 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 26, the flux containing: a hydrogenated dimer acid obtained by adding hydrogen to (hydrogenating) the dimer acid with 36 carbon atoms which was a reaction product of oleic acid and linoleic acid as an organic acid with 12 or more carbon atoms in an amount of 1 wt %, which was decreased within the range defined in the present invention; further glutaric acid with 5 carbon atoms as a different organic acid in an amount of 1 wt % within the range defined in the present invention; 2-phenylimidazole as an amine in an amount of 1 wt % within the range defined in the present invention; isobornyl cyclohexanol in an amount of 77 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 79.4 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 27, the flux containing: a hydrogenated dimer acid obtained by adding hydrogen to (hydrogenating) the dimer acid with 36 carbon atoms which was a reaction product of oleic acid and linoleic acid as an organic acid with 12 or more carbon atoms in an amount of 5 wt % within the range defined in the present invention; further 2-phenylimidazole as an amine in an amount of 0.5 wt % within the range defined in the present invention; isobornyl cyclohexanol in an amount of 74.5 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 78.8 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 28, the flux containing: a hydrogenated dimer acid obtained by adding hydrogen to (hydrogenating) the dimer acid with 36 carbon atoms which was a reaction product of oleic acid and linoleic acid as an organic acid with 12 or more carbon atoms in an amount of 5 wt % within the range defined in the present invention; further 2-phenylimidazole as an amine in an amount of 5 wt %, which was increased within the range defined in the present invention; isobornyl cyclohexanol in an amount of 70 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 77.8 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 29, the flux containing: a hydrogenated dimer acid obtained by adding hydrogen to (hydrogenating) the dimer acid with 36 carbon atoms which was a reaction product of oleic acid and linoleic acid as an organic acid with 12 or more carbon atoms in an amount of 5 wt % within the range defined in the present invention; further 2-ethylaminoethanol as an amine in an amount of 5 wt %, which was increased within the range defined in the present invention; isobornyl cyclohexanol in an amount of 70 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 77.8 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 30, the flux containing: a trimer acid with 54 carbon atoms which was a reaction product of oleic acid and linoleic acid as an organic acid with 12 or more carbon atoms in an amount of 5 wt % within the range defined in the present invention; isobornyl cyclohexanol in an amount of 75 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 78.9 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 31, the flux containing: a hydrogenated trimer acid obtained by adding hydrogen to (hydrogenating) a trimer acid with 54 carbon atoms which was a reaction product of oleic acid and linoleic acid as an organic acid with 12 or more carbon atoms in an amount of 5 wt % within the range defined in the present invention; isobornyl cyclohexanol in an amount of 75 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 78.9 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

As shown in Executed Example 32, the flux containing: an organic acid mixture including 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid as an organic acid mixture including an organic acid with 10 or more carbon atoms in an amount of 5 wt % within the range defined in the present invention; further glycolic acid with 4 carbon atoms as a different organic acid in an amount of 15 wt %, which was increased within the range defined in the present invention; isobornyl cyclohexanol in an amount of 60 wt % within the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 75.0 wt % within the range defined in the present invention, also provided good solder wet spreading and a sufficient solder wet spreading effect. Also, the solder balls could be retained at ordinary temperature before heating. Furthermore, a sufficient effect of suppressing the residue amount to attain low residue was obtained.

Contrary to these, as shown in Comparison Example 1, the flux containing: an organic acid mixture including 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid as an organic acid mixture including an organic acid with 10 or more carbon atoms in an amount of 20 wt %, which fell beyond the range defined in the present invention; isobornyl cyclohexanol in an amount of 60 wt %; and 1,3-butylene glycol as a different solvent in an amount of 20 wt %, wherein, when the total amount of isobornyl cyclohexanol and the different solvent was 100 wt %, the ratio of isobornyl cyclohexanol was 75 wt % within the range defined in the present invention, provided a solder wet spreading effect and an effect of retaining the solder balls at ordinary temperature before heating. However, the residue amount exceeded 15 wt % and could not be suppressed, so that the low residue effect was not obtained.

As shown in Comparison Example 2, the flux containing: no organic acid mixture including an organic acid with 10 or more carbon atoms; no organic acid with 12 or more carbon atoms; glycolic acid with 4 carbon atoms as an organic acid in an amount of 5 wt % within the range defined in the present invention; isobornyl cyclohexanol in an amount of 75 wt %; and 1,3-butylene glycol as a different solvent in an amount of 20 wt %, wherein, when the total amount of isobornyl cyclohexanol and the different solvent was 100 wt %, the ratio of isobornyl cyclohexanol was 78.9 wt % within the range defined in the present invention, provided an effect of retaining the solder balls at ordinary temperature before heating and a low residue effect. However, the wet spreading diameter of the solder was less than 350 µm, the solder was not wet spread, and the solder wet spreading effect was not obtained.

As shown in Comparison Example 3, the flux containing: no organic acid mixture including an organic acid with 10 or more carbon atoms; no organic acid with 12 or more carbon atoms; glycolic acid with 4 carbon atoms as an organic acid in an amount of 15 wt %, which was increased within the range defined in the present invention; isobornyl cyclohexanol in an amount of 65 wt %; and 1,3-butylene glycol as a different solvent in an amount of 20 wt %, wherein, when the total amount of isobornyl cyclohexanol and the different solvent was 100 wt %, the ratio of isobornyl cyclohexanol was 76.5 wt % within the range defined in the present invention, also provided an effect of retaining the solder balls at ordinary temperature before heating and a low residue effect. However, the solder wet spreading effect was not obtained.

As shown in Comparison Example 4, the flux containing: an organic acid mixture including 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid as an organic acid mixture including an organic acid with 10 or more carbon atoms in an amount of 5 wt % within the range defined in the present invention; containing no isobornyl cyclohexanol; and 1,3-butylene glycol as solvents in an amount of 95 wt %, which fell beyond the scope defined in the present invention, wherein the ratio of isobornyl cyclohexanol was 0 wt %, which fell below the range defined in the present invention, provided a solder wet spreading effect and a low residue effect. However, the effect of retaining the solder balls at ordinary temperature before heating was not obtained.

As shown in Comparison Example 5, the flux containing: an organic acid mixture including 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid as an organic acid mixture including an organic acid with 10 or more carbon atoms in an amount of 5 wt % within the range defined in the present invention; polymerized rosin as rosin, which was not added in the present invention, in an amount of 35 wt %; isobornyl cyclohexanol in an amount of 40 wt %, which fell below the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 66.7 wt % within the range defined in the present invention, provided a solder wet spreading effect and an effect of retaining the solder balls at ordinary temperature before heating. However, the low residue effect was not obtained since the rosin formed residues.

As shown in Comparison Example 6, the flux containing: an organic acid mixture including 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid as an organic acid mixture including an organic acid with 10 or more carbon atoms in an amount of 5 wt % within the range defined in the present invention; an epoxy resin, which was not added in the present invention, in an amount of 35 wt %; isobornyl cyclohexanol in an amount of 40 wt %, which fell below the range defined in the present invention; and 1,3-butylene glycol as a different solvent in an amount of 20 wt % within the range defined in the present invention, wherein, when the total amount of isobornyl cyclohexanol and the different solvent was 100 wt %, the ratio of isobornyl cyclohexanol was 66.7 wt % within the range defined in the present invention, also provided a solder wet spreading effect and an effect of retaining the solder balls at ordinary temperature before heating. However, the low residue effect was not obtained since the epoxy resin formed residues.

In view of the above, the flux containing: 1 wt % or more and 15 wt % or less of an organic acid mixture including an organic acid with 10 or more carbon atoms; 50 wt % or more and 90 wt % or less of isobornyl cyclohexanol; and 5 wt % or more and 45 wt % or less of a different solvent, wherein, when the total amount of the isobornyl cyclohexanol and the different solvent is 100 wt %, the ratio of the isobornyl cyclohexanol is 50 wt % or more and 95 wt % or less, and wherein the organic acid mixture containing an organic acid with 10 or more carbon atoms includes 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid, and the solder paste using the flux can provide good solder wet spreading. Also, the solder balls could be retained at ordinary temperature before heating. Furthermore, the residue amount was suppressed.

Further, the flux containing: 1 wt % or more and 15 wt % or less of an organic acid with 12 or more carbon atoms; 50 wt % or more and 90 wt % or less of isobornyl cyclohexanol; and 5 wt % or more and 45 wt % or less of a low different solvent, wherein, when the total amount of the isobornyl cyclohexanol and the different solvent is 100 wt %, the ratio of the isobornyl cyclohexanol is 50 wt % or more and 95 wt % or less, and the solder paste using the flux can provide good solder wet spreading. Also, the solder balls could be retained at ordinary temperature before heating. Furthermore, the residue amount was suppressed.

These effects were not inhibited even by incorporating an organic acid with less than 12 carbon atoms, an amine, an amine hydrohalide, and an organohalogen compound as activators within the ranges defined in the present invention. It was found that, in particular, when an organic acid mixture including an organic acid with 10 or more carbon atoms was contained in an amount of 1 wt % or more and 3 wt % or less, and when an organic acid with 12 or more carbon atoms was contained in an amount of 1 wt % or more and 3 wt % or less, the addition of other activators such as an amine in an amount of 0.5 wt % or more was more preferable. In addition, it was found that, when an organic acid mixture including an organic acid with 10 or more carbon atoms was contained in an amount of more than 3 wt % and 15 wt % or less, and when an organic acid with 12 or more carbon atoms was contained in an amount of more than 3 wt % and 15 wt % or less, sufficient activity was obtained even though no other activator was contained. It was also found that, even in this case, the inclusion of a different activator further increased the activity, and the retention properties of solder balls and the low residue property were not inhibited.

The invention claimed is:

1. A flux comprising:
   1 wt % or more and 15 wt % or less of an organic acid mixture including an organic acid with 10 or more carbon atoms;
   50 wt % or more and 90 wt % or less of isobornyl cyclohexanol; and
   5 wt % or more and 45 wt % or less of a different solvent,
   the flux being free of a thermosetting resin,
   wherein, when a total amount of the isobornyl cyclohexanol and the different solvent is 100 wt %, a ratio of the isobornyl cyclohexanol is 50 wt % or more and 95 wt % or less, and
   wherein the organic acid mixture including an organic acid with 10 or more carbon atoms includes 2-methylnonanedioic acid, 4-(methoxycarbonyl)-2,4-dimethylundecanedioic acid, 4,6-bis(methoxycarbonyl)-2,4,6-trimethyltridecanedioic acid, and 8,9-bis(methoxycarbonyl)-8,9-dimethylhexadecanedioic acid.

2. The flux according to claim 1, further comprising:
   0 wt % or more and 15 wt % or less of an organic acid with less than 12 carbon atoms;
   0 wt % or more and 5 wt % or less of an amine;
   0 wt % or more and 1 wt % or less of an amine hydrohalide; and
   0 wt % or more and 5 wt % or less of an organohalogen compound.

3. The flux according to claim 1, wherein the organic acid mixture including an organic acid with 10 or more carbon atoms comprises 30 wt % or more and 60 wt % or less of 2-methylnonanedioic acid, 8 wt % or more and 20 wt % or less of 4-(methoxycarbonyl)-2,4-dimethylundecanedioic acid, 8 wt % or more and 20 wt % or less of 4,6-bis(methoxycarbonyl)-2,4,6-trimethyltridecanedioic acid, and 15 wt % or more and 30 wt % or less of 8,9-bis(methoxycarbonyl)-8,9-dimethylhexadecanedioic acid, when a total amount of the organic acid mixture is 100 wt %.

4. The flux according to claim 3, further comprising:
   0 wt % or more and 15 wt % or less of an organic acid with less than 12 carbon atoms;
   0 wt % or more and 5 wt % or less of an amine;
   0 wt % or more and 1 wt % or less of an amine hydrohalide; and
   0 wt % or more and 5 wt % or less of an organohalogen compound.

5. A solder paste, comprising:
solder powder; and
the flux according to claim 1.

6. The solder paste according to claim 5, wherein the flux further comprises:
- 0 wt % or more and 15 wt % or less of an organic acid with less than 12 carbon atoms;
- 0 wt % or more and 5 wt % or less of an amine;
- 0 wt % or more and 1 wt % or less of an amine hydrohalide; and
- 0 wt % or more and 5 wt % or less of an organohalogen compound.

7. The solder paste according to claim 5, wherein the organic acid mixture including an organic acid with 10 or more carbon atoms comprises 30 wt % or more and 60 wt % or less of 2-methylnonanedioic acid, 8 wt % or more and 20 wt % or less of 4-(methoxycarbonyl)-2,4-dimethylundecanedioic acid, 8 wt % or more and 20 wt % or less of 4,6-bis(methoxycarbonyl)-2,4,6-trimethyltridecanedioic acid, and 15 wt % or more and 30 wt % or less of 8,9-bis(methoxycarbonyl)-8,9-dimethylhexadecanedioic acid, when a total amount of the organic acid mixture is 100 wt %.

8. The solder paste according to claim 7, wherein the flux further comprises:
- 0 wt % or more and 15 wt % or less of an organic acid with less than 12 carbon atoms;
- 0 wt % or more and 5 wt % or less of an amine;
- 0 wt % or more and 1 wt % or less of an amine hydrohalide; and
- 0 wt % or more and 5 wt % or less of an organohalogen compound.

* * * * *